May 2, 1950 F. J. PERILLO 2,506,170
SLIDE POSITIONING MECHANISM FOR PROJECTORS
Original Filed July 10, 1946 2 Sheets-Sheet 2
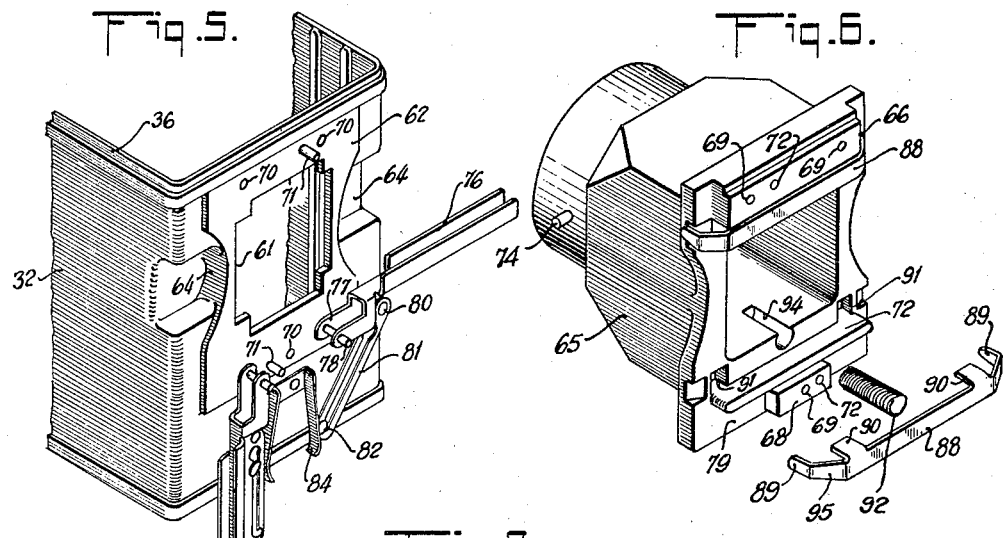
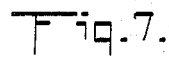
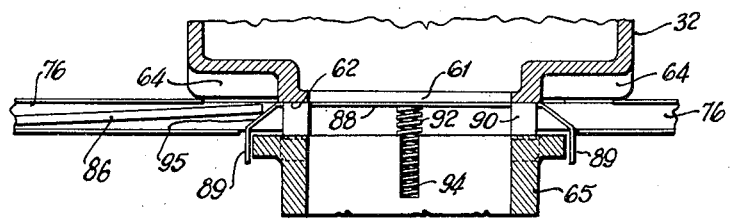
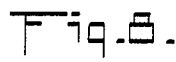
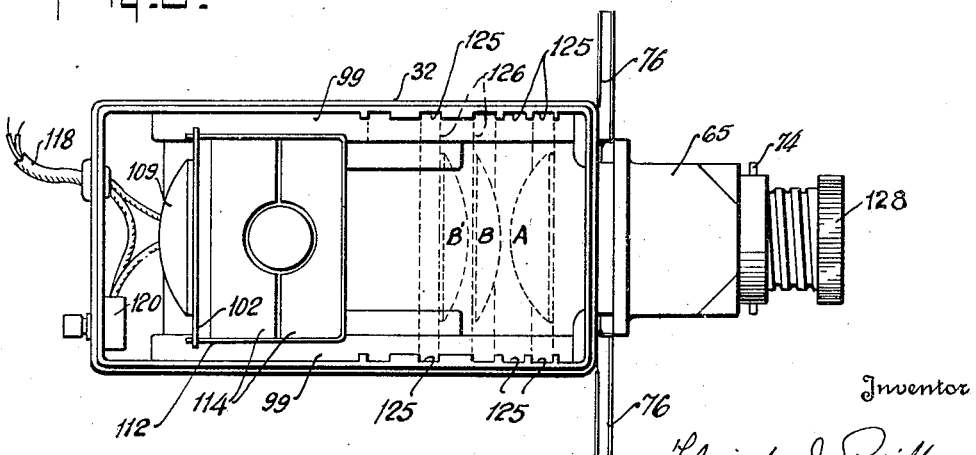
Inventor
Florindo J. Perillo
By Williams, Rich & Morse
Attorneys Patented May 2, 1950

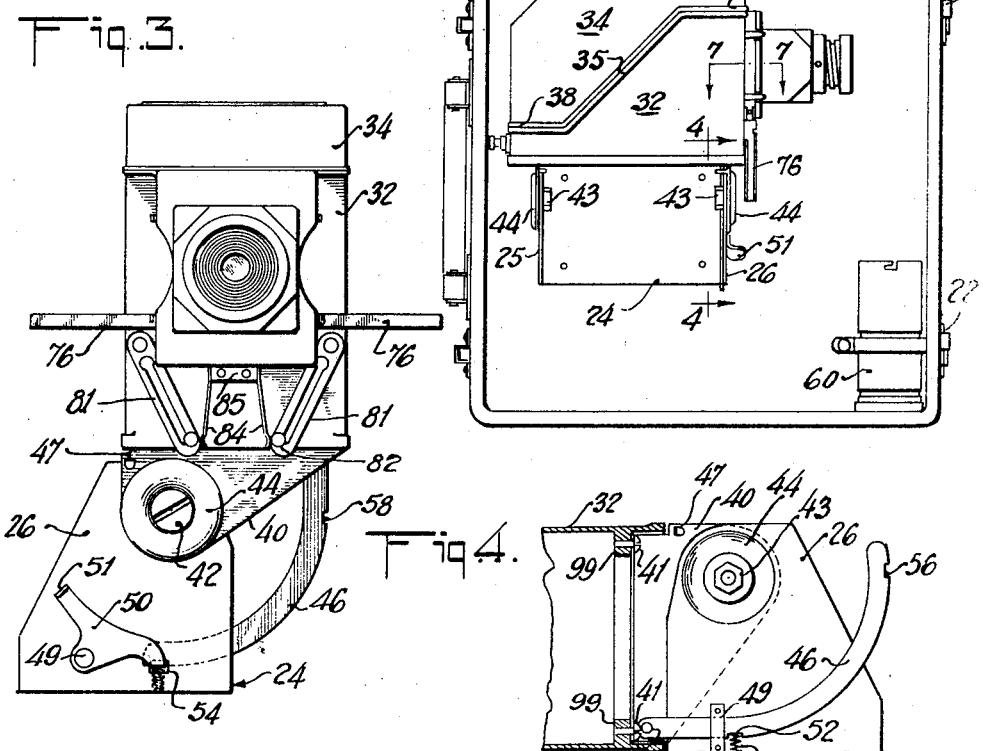

2,506,170

UNITED STATES PATENT OFFICE 2,506,170

SLIDE POSITIONING MECHANISM FOR PROJECTORS

Florindo J. Perillo, Jackson Heights, N. Y., assignor to Viewlex, Inc., Queens County, N. Y., a corporation of New York Original application July 10, 1946, Serial No. 682,633. Divided and this application September 10, 1947, Serial No. 773,202

7 Claims. (Cl. 88—28)

This invention relates to apparatus for projecting transparencies on a screen in enlarged form. More particularly it relates to slide projection apparatus which is light, portable, self-contained and folds compactly into a carrying case and which is capable of being quickly set up for the projection of images and as quickly repacked for transport.

This application is a division of my co-pending application Ser. No. 682,633, filed July 10, 1946, and is directed particularly to the means therein disclosed for positioning the transparent slides between the illuminating system and the lens of the projector. Other subject matter disclosed but not claimed herein is claimed in my co-pending application Ser. No. 30,253, filed June 1, 1948.

With the rapid development and popularity of still photography on 35 mm film, which has taken place in recent years, there is now widespread use of film slides and film strips for projection purposes. Positive transparencies are made from 35 mm negatives or by reversal processes and utilized in the form of film strips containing pictures in either "single-frame" or "double-frame" sizes, in both black and white and color. Or such positive transparencies are singly mounted in suitable holders which are generally 2 inches square and inserted individually into projection apparatus for producing enlarged images on a screen. Such individually mounted transparencies are referred to as film slides.

The pictorial method of presenting information makes film slide projectors useful in many fields such as education, vocational training, selling and amusement. They may be used for teaching in schools, industrial training, sales story presentation and in other obvious ways. These many possible uses make desirable highly adaptable projection apparatus which can be used not only for the projection of highly magnified pictures on screens in darkened rooms but also for projection of smaller pictures, for example 8 x 12 inches, with illumination sufficiently bright for use in a room under ordinary light conditions. The utility of projection apparatus which is completely self-contained and which can be rapidly set up without disturbing the arrangement of a room in a dwelling or office, to show projected images of a size sufficient to be clearly seen by a small group of people will be self evident.

The principal objects of the invention claimed herein are:

(a) To meet the need for a completely self-contained projection outfit;

(b) To provide such an outfit in complete form in a carrying case which contains all the essential apparatus and into which the projector is compactly folded when not in use;

(c) To provide features of collapsibility of various elements to enhance portability and economy of space;

(d) To provide folding slide guiding means quickly movable into and out of operative position; and (e) To provide simple and effective cooperating means for holding film slides, introduced through said guiding means, in the proper plane for projection.

Other objects and advantages will become apparent in the course of the following detailed description of the present preferred embodiment of the invention, taken in conjunction with the drawings, in which:

Fig. 1 is a perspective view of a complete projection outfit set up for use with a short focal length lens to project a picture substantially filling the viewing screen;

Fig. 2 is a top plan view of one half of the carrying case showing the projector in folded position;

Fig. 3 is a front elevation of the projector and its support, in erected position ready for use with the slide guides extended;

Fig. 4 is a rear elevation of the front portion of the projector support with a fragmentary section of the projector housing shown in folded position, taken on the line 4—4 of Fig. 2.

Fig. 5 is a fragmentary perspective of the front of the projector housing with the lens mount removed showing one slide guide in operative position and the other one folded;

Fig. 6 is a perspective of the lens mount detached from the housing and viewed from the left rear, one slide pressure bar and its spring being shown for clarity as removed from their normal assembled positions;

Fig. 7 is a fragmentary horizontal section through the junction of housing and lens mount taken on the line 7—7 of Fig. 2, and showing the cooperative relationship between the slide guiding and slide holding means; and Fig. 8 is a top plan view of the projector with the cover removed, the condenser lens carriers being shown in broken lines the slide guides being in extended position.

Fig. 1 shows a complete projection apparatus embodying the invention which comprises a two-part carrying case having a lower half 20 and an upper half 21 hinged together along one edge by separable hinges 22. The depth of the two case parts at the hinge point is equal and the abutting side edges of the two case parts are preferably sloping as shown, so that the lower half 20 is deeper. Secured to the largest side of the lower half is a projector supporting member 24 having two upstanding brackets 25 and 26. A projector, generally indicated at 28, is pivotally mounted on said brackets and, when in the position shown, projects an image on a screen 29 which stands upright in supports 30 which may be hinged or otherwise fixed to the upper half 21 of the case so that the screen may be folded flat inside the upper half of the case.

The projector 28 has a two-part housing, to contain the illumination system, consisting of the body portion 32 and a cover 34 which are preferably die castings. The cover is removable and the cover and body separate along a line which extends diagonally downward from front to rear throughout the major portion of the length of the housing, as indicated at 35, the line of division being horizontal at the front 36 and back 38.

Referring particularly to Figs. 3 and 4, the housing 32 is pivotally mounted on the brackets 25 and 26 through brackets 39, 40 which are attached as by screws 41 to the underside of the housing body 32. The brackets 26 and 40 at the front end are fastened together by means of a shouldered screw 42 and a nut 43. The portions of the brackets 26 and 40 surrounding the screw 42 are preferably dished, as shown at 44, so as to form substantial bearing or pivoting surfaces independent of the screw. The brackets 25 and 39 are fastened together in a like manner. The point of attachment of the brackets 39 and 40 to the brackets 25 and 26 is a substantial distance above the bottom of member 24, and the pivot points of the brackets 39 and 40 are offset from the center of housing 32 toward one side thereof, so that when the projector is turned on its side, as shown in Figs. 2 and 3, it lies flat against the bottom of the case and when erected into the position shown in Fig. 3, it is elevated sufficiently so that the axis of its lens is approximately opposite the center of screen 29.

Locking means are provided, for maintaining the projector in its folded or upright position, including a flat arcuate bar 46, the curve of which has the center of screw 42 as its center. This bar is pivotally attached to the inside front portion of the body 32 of the housing, as shown at 48 in Fig. 4 and slides through a cleat 49 secured to the bracket 26 on its inner side. Pivotally mounted at 49 on the outer face of bracket 26 is a lever 50 having a thumb piece 51 and a catch 52, the latter extending through an opening 54 in bracket 26. Under the edge of bar 46 a spring 55 urges the catch 52 upward toward the bar 46 and the latter is provided with two notches 56 and 58 which engage the catch 52 to hold the projector in either position. A lug 47 punched out at right angles from bracket 40 engages the top edge of bracket 26 when the projector is upright and acts as a stop, making the structure more rigid.

Referring particularly to Figs. 5, 6 and 7, the front end of the housing 32 is provided with an aperture 61 through which the light passes to the film slide, this aperture being surrounded by a flat, smooth surface 62. The face of the housing 32 is indented at either side of the aperture 61, as shown at 64, so that a single film slide may be pushed into centered position with respect to the aperture, the indentation 64 providing space for the user's finger or thumb. A lens mount 65, which is also preferably a die casting, is provided which has on its rear surface an upper spacing block 66 and a lower spacing block 68 having tapped holes 69 to receive screws. Corresponding clearance holes 70 are provided at the top and bottom of the flat portion 62 of the housing 32. The lens mount may be centered on the front of the housing by means of locating pins 71 set in the housing which enter holes 72 in the lens mount, which is then secured in place by screws passing through the holes 70 and into the holes 69. When the lens mount is in position on the housing there is a space between it and the housing defined at the top by the block 66 and at the bottom by a flat ledge 72, which may, if desired, be continuous with the lower block 68. Through this space the film slides or other form of transparencies are introduced in front of the light coming through the aperture 61. The front end of the lens mount may be constructed in any manner desired so as to adjustably receive various types of lenses which may either be inserted in the aperture in the front of the mount or coupled to the outside thereof by means of bayonet slots cooperating with pins 74.

The means for guiding film slides into position in front of the aperture 61 and in line with the lens axis and holding them there during projection consist of folding slide guides and cooperating spring-actuated pressure bars which will now be described. The folding slide guides consist of right and left-hand members, best shown in Fig. 5, which may be formed of sheet metal bent into the shape illustrated and having U-shaped channel portions 76 integral with bifurcated end portions 77 perforated to slip over pins 78. When the lens mount is in position, pins 78 and portions 77 are beneath the ledge 72 of the lens mount on either side of block 68 and the bottoms of channel portions 76 are in alinement with the upper surface of ledge 72 when the slide guides are raised as shown in Fig. 3. The pins 78 are set into the face of the housing 72 and are of such length that their outer ends are in contact with the face 79 of mount 65. Pivotally attached to each slide guide at 80 are slotted links 81 which operate over fixed headed pins 82 fastened to the housing 32. A spring 84 with two downwardly extending leaves perpendicular to the face of housing 32 pushes the links against the pins so that the offset ends of the slots in the links lock the links in the extended position shown in Fig. 3. The spring 84 has a bridge portion 85 attached to the housing by rivets or the like. It will be apparent that by pressing links 81 toward spring 84 the slide guides may be released and lowered into the vertical position shown at the left in Fig. 5. As shown in Fig. 7, with the slide guides in their operative or horizontal position, they will support a slide 86 as it is introduced into or ejected from the projection position before the aperture 61.

When the slide is in projection position, it is held flat against the surface 62 of the housing so as to be in the focal plane of the lens. This is accomplished by means of a pair of upper and lower pressure bars 88 which are of the shape best shown at the lower part of Fig. 6. Their ends are first bent at an obtuse angle to their principal surface and again bent to terminate in tongues 89 which closely surround a portion of the lens mount and prevent lateral movement of the bars. On one edge of each bar 88 are two tongues 90 which enter apertures 91 formed in the lens mount. These apertures are sufficiently deep so that the bar may move away from the face 62 of the housing to permit the passage of a slide and they serve to prevent vertical movement of the pressure bars. Coil springs 92, seated in recesses 94 in the lens mount, bear against the centers of the bars and urge them toward the face 62 of housing 32 to engage the slides at top and bottom. As shown in Fig. 7, on being introduced into the projector, the slide 86, resting in the channel 76, first engages the angular faces 95 on the corresponding ends of upper and lower bars 88 and forces them away from the face 62 of the housing against the pressure of springs 92. Since the bars 88 are symmetrical at their ends, slides may be introduced from either side. If desired, two springs may be used with each of the bars 88, spaced inwardly from their ends but a single central spring has been found sufficient.

Where one slide is in position for projection, in front of aperture 61, it is shoved out of this position and received in one of the guides 76 upon insertion of another slide, the edges of the two slides being brought into abutting relation by the combined guiding action, upon the slide being inserted, of the guide 76, the flat face 62 of housing 32 and the angular faces 95 of the bars 88.

Referring to Fig. 8, a top plan view of the complete projector is shown with the top cover 34 removed to show the relationship of the several parts which are described in more detail in my aforesaid application Ser. No. 682,633. Briefly, housing 32 is provided inside its bottom with parallel horizontal rails or ribs 99 which support an upstanding lamp house with a back 102 carrying a reflector 109, and a chimney 112 in which are light baffles 114. Current is supplied to the lamp through wires 118 and switch 120. In the deep front part of housing 32 are vertical guideways or slots 125 for slides 126 which carry condenser lens elements A, B and B' which are arranged to concentrate the light on the slides inserted behind lens 128 in the plane of the guides 76.

It will be noted particularly that the invention provides an extremely simple, effective and rugged slide guiding and holding mechanism which effectively guides and supports one slide on either side of the slide which is in position for projection, yet without any parts which have to be removed from the projector when it is packed for carrying. The guides 76 when folded are entirely within the confines of the projector sides and it can lie absolutely flat on its side. The guides can be instantly moved into operating position and automatically locked there.

It is to be understood that the invention is not limited to the structural details of the illustrative embodiment above described, since many obvious modifications may be made therein without departing from the spirit of the invention as defined in the claims.

What is claimed is:

1. In a projector having a lamp housing and lens mount between which is a passage having a horizontal bottom adapted to receive a slide, slide guiding and positioning means comprising a pivotally mounted channel member adapted to be swung into and out of alinement with said bottom, means for supporting said member in alined position, a pressure bar extending horizontally through said passage adapted to hold said slide against one of the faces thereof, said bar having an end extending angularly across said channel adapted to be engaged by a slide moved therethrough whereby movement of the slide into said passage displaces said bar, and resilient means acting upon said bar to urge it toward one side of said passage.

2. Slide guiding and positioning means as defined in claim 1 wherein one of said channel members is provided on each side of said passage and said pressure bar extends angularly at each end across each of said channels whereby slides may be introduced into said passage from either side.

3. Slide guiding and positioning means as defined in claim 1 wherein one of said pressure bars is provided at the top and another at the bottom of said passage for simultaneously engaging the top and bottom of a slide positioned therein.

4. In a projector having a slide passage between the lamp housing and lens mount, slide guiding means for directing slides into and out of said passage comprising a pair of pivotally mounted guide members, means for pivotally supporting said members at their inner ends adjacent said passage, links pivoted to said members to support them in raised position, fixed stops on said housing, said links being slidably connected with said stops, said links having notches adapted to engage said stops when said members are in raised positions, and resilient means urging said notches into locking relation with said stops.

5. The guiding means defined in claim 4 in which said guide members are in the form of channels throughout most of that portion which extends outwardly from said slide passage, the bottoms of said channels being in alinement with the bottom of said passage when said members are in raised position.

6. The guiding means defined in claim 4 in which said guide members have their pivotal points beneath said slide passage, form a continuous straight support together with the bottom of the passage when in raised position, and when lowered extend downwardly within the limits of the sides of the housing or projections of those sides.

7. In a slide projector casing provided with a passage to receive a slide, means for urging the slide into contact with a face of said passage comprising, a pressure bar extending through said passage, the ends of said bar extending angularly away from said face to engage said slide at an angle as it is introduced into said passage, a spring extending into said passage and positioned to press against the center of said bar, means for supporting said spring, said casing having a pair of recesses adjacent said bar and spaced on either side of its center, said bar being provided with tongues bent at right angles to the surface of said bar and extending into said recesses to maintain the bar in position in an endwise direction while permitting it to move at either end away from the face of said passage toward which it is urged by said spring when a slide is inserted between said face and said bar.

FLORINDO J. PERILLO.

REFERENCES CITED

The following references are of record in the file of this patent:

UNITED STATES PATENTS

| Number | Name | Date |
| --- | --- | --- |
| 2,298,413 | Reid | Oct. 13, 1942 |

FOREIGN PATENTS

| Number | Country | Date |
| --- | --- | --- |
| 22,151 | Great Britain | of 1892 |